(12) United States Patent
Martin et al.

(10) Patent No.: US 11,420,383 B2
(45) Date of Patent: Aug. 23, 2022

(54) SYSTEM AND METHOD FOR ADDITIVELY MANUFACTURING COMPONENTS USING CONTAINMENT WALLS

(71) Applicant: General Electric Company, Schenectady, NY (US)

(72) Inventors: Andrew J. Martin, Blue Ash, OH (US); Timothy Joseph Wilhelm, Miamisburg, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 60 days.

(21) Appl. No.: 17/014,152

(22) Filed: Sep. 8, 2020

(65) Prior Publication Data
US 2022/0072767 A1    Mar. 10, 2022

(51) Int. Cl.
| | | |
|---|---|---|
| *B29C 64/40* | (2017.01) | |
| *B29C 64/153* | (2017.01) | |
| *B29C 64/25* | (2017.01) | |
| *B29C 64/245* | (2017.01) | |
| *B29C 64/357* | (2017.01) | |
| *B29C 64/241* | (2017.01) | |
| *B33Y 30/00* | (2015.01) | |
| *B33Y 10/00* | (2015.01) | |

(52) U.S. Cl.
CPC .......... *B29C 64/153* (2017.08); *B29C 64/241* (2017.08); *B29C 64/245* (2017.08); *B29C 64/25* (2017.08); *B29C 64/357* (2017.08); *B29C 64/40* (2017.08); *B33Y 10/00* (2014.12); *B33Y 30/00* (2014.12)

(58) Field of Classification Search
CPC .......... B29C 64/40; B22F 10/40; B22F 10/43; B22F 10/47
See application file for complete search history.

(56) References Cited

U.S. PATENT DOCUMENTS

| | | | |
|---|---|---|---|
| 4,957,270 A | 9/1990 | Rummage et al. | |
| 6,467,749 B1 | 10/2002 | van de Camp | |
| 10,449,696 B2 | 10/2019 | Elgar et al. | |
| 2004/0175451 A1* | 9/2004 | Maekawa | B29C 41/46 425/375 |
| 2013/0101746 A1* | 4/2013 | Keremes | B29C 64/153 427/457 |
| 2013/0270727 A1 | 10/2013 | Bauer-Juarez | |

(Continued)

*Primary Examiner* — Timothy Kennedy
(74) *Attorney, Agent, or Firm* — Dority & Manning, P.A.

(57) ABSTRACT

A system for additively manufacturing components includes a build chamber and a build plate on which a component and a containment wall surrounding the component are additively formed. The containment wall surrounds the component such that powder is present between the component and the containment wall, with the containment wall including first and second portions joined together at a separation line. Additionally, the build plate is positioned within the build chamber. Furthermore, a tooling assembly configured to split the containment wall at the separation line and pull the first portion of the containment wall away from the second portion of the containment wall while the build plate is present within the build chamber such that a portion of the powder is exposed. Moreover, a vacuum configured to remove the exposed portion of the powder from the build chamber while the build plate is present within the build chamber.

15 Claims, 6 Drawing Sheets

(56) References Cited

U.S. PATENT DOCUMENTS

| | | | | |
|---|---|---|---|---|
| 2014/0333011 A1* | 11/2014 | Javidan | ............... | B29C 64/118 264/401 |
| 2017/0036404 A1 | 2/2017 | Rengers et al. | | |
| 2017/0113413 A1* | 4/2017 | Iwase | ............... | B29C 64/40 |
| 2017/0159448 A1* | 6/2017 | Harding | ............... | F01D 25/005 |
| 2017/0225404 A1* | 8/2017 | Naruse | ............... | B33Y 40/00 |
| 2017/0232511 A1* | 8/2017 | Fieldman | ............... | B23K 26/342 419/7 |
| 2017/0232512 A1* | 8/2017 | Joerger | ............... | B29C 64/40 419/53 |
| 2017/0232670 A1* | 8/2017 | Joerger | ............... | B33Y 40/20 264/497 |
| 2017/0232671 A1* | 8/2017 | Fieldman | ............... | B22F 10/40 264/497 |
| 2017/0232672 A1* | 8/2017 | Fieldman | ............... | B33Y 10/00 264/497 |
| 2017/0232682 A1* | 8/2017 | Alcantara Marte | ............... | B22F 10/20 264/497 |
| 2017/0232683 A1* | 8/2017 | Alcantara Marte | ............... | B29C 64/153 264/497 |
| 2018/0141122 A1* | 5/2018 | Fieldman | ............... | B22F 10/20 |
| 2018/0154441 A1* | 6/2018 | Miller | ............... | B22F 10/40 |
| 2018/0154589 A1* | 6/2018 | Herman | ............... | B29C 64/40 |
| 2018/0162060 A1* | 6/2018 | Mark | ............... | B22F 10/40 |
| 2018/0345372 A1* | 12/2018 | Corsmeier | ............... | B22F 10/70 |
| 2019/0009368 A1* | 1/2019 | Levine | ............... | B29C 64/153 |
| 2019/0015923 A1* | 1/2019 | O'Neill | ............... | B22F 10/20 |
| 2019/0143408 A1 | 5/2019 | Graham et al. | | |
| 2019/0240773 A1 | 8/2019 | Carter | | |
| 2019/0240774 A1 | 8/2019 | Carter et al. | | |
| 2019/0240913 A1 | 8/2019 | Jordan | | |
| 2019/0270254 A1* | 9/2019 | Mark | ............... | B29C 64/295 |
| 2019/0351612 A1* | 11/2019 | Huang | ............... | B29C 64/379 |
| 2019/0389138 A1* | 12/2019 | Franzen, Jr. | ............... | B22F 7/06 |

\* cited by examiner

SYSTEM AND METHOD FOR ADDITIVELY MANUFACTURING COMPONENTS USING CONTAINMENT WALLS

FIELD

The present disclosure generally pertains to systems and methods for additively manufacturing components and, more specifically, to systems and methods for additively manufacturing components using containment walls.

BACKGROUND

In recent years, the use of additive manufacturing processes, such as powder bed fusion (PBF) techniques, have grown dramatically. In general, additive manufacturing processes allow the formation of component features (e.g., passages, chambers, voids, and the like) that cannot otherwise be formed using conventional casting and machining processes. As such, turbomachine components that require complex internal geometries, such as gas turbine engine vanes, blades, and fuel nozzles, are now commonly formed using additive manufacturing processes.

Additive manufacturing processes form a component by building up successive layers of material to form the final three-dimensional shape of the component. For example, when using PBF techniques, a first layer of powder is spread across a build plate positioned within a build chamber of an additive manufacturing machine. A portion of this powder is then fused together (e.g., with a laser) to form the first layer of the component. Thereafter, a second layer of powder is spread across the first layer of powder and a portion of this powder is fused together to form the second layer of the component. This process is repeated until the entire three-dimensional component has been formed.

PBF techniques can require a significant amount of powder that is not used to form the component. More specifically, as indicated above, when using a PBF technique, powder is spread across the entire build plate. However, the component (or components) being formed may occupy only a small portion of the build plate. Thus, when the formation of the component(s) is completed, the entire build plate is covered in a layer of powder that is the same height as the finished component(s).

To reduce powder consumption, containment walls have been developed. Specifically, a containment wall is formed around each component on the build plate during the formation of the component. As such, the containment wall(s) retain powder within a small region(s) surrounding the component(s) on the build plate. Thus, it is not necessary to cover the entire build plate with the powder. After formation of the component(s), the build plate is removed from the build chamber to allow removal of the containment wall(s) and powder retained thereby. However, this exposes the powder to the oxygen and moisture present within the ambient atmosphere. The powder is expensive and must be discarded after it has been exposed to the ambient atmosphere a certain number of times (e.g., ten times).

Accordingly, an improved system and method for additively manufacturing components would be welcomed in the technology. Specifically, a system and method for additively manufacturing components that does not expose the unused powder to the ambient atmosphere would be welcomed in the technology.

BRIEF DESCRIPTION

Aspects and advantages of the invention will be set forth in part in the following description, or may be obvious from the description, or may be learned through practice of the invention.

In one aspect, the present subject matter is directed to a system for additively manufacturing components. The system includes a build chamber and a build plate on which a component and a containment wall surrounding the component are additively formed. The containment wall, in turn, surrounds the component such that powder is present between the component and the containment wall, with the containment wall including first and second portions joined together at a separation line. Additionally, the build plate is positioned within the build chamber. Furthermore, the system includes a tooling assembly configured to split the containment wall at the separation line and pull the first portion of the containment wall away from the second portion of the containment wall while the build plate is present within the build chamber such that a portion of the powder is exposed. Moreover, the system includes a vacuum configured to remove the exposed portion of the powder from the build chamber while the build plate is present within the build chamber.

In another aspect, the present subject matter includes a method for additively manufacturing a component on a build plate positioned within a build chamber. The component is, in turn, surrounded by a containment wall positioned on the build plate such that powder is present between the component and the containment wall, with the containment wall including first and second portions joined together at a separation line. The method includes splitting the containment wall at the separation line while the build plate is present within the build chamber. Furthermore, the method includes pulling the first portion of the containment wall away from the second portion of the containment wall while the build plate is present within the build chamber such that a portion of the powder is exposed. Additionally, the method includes removing the exposed portion of the powder from the build chamber while the build plate is present within the build chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
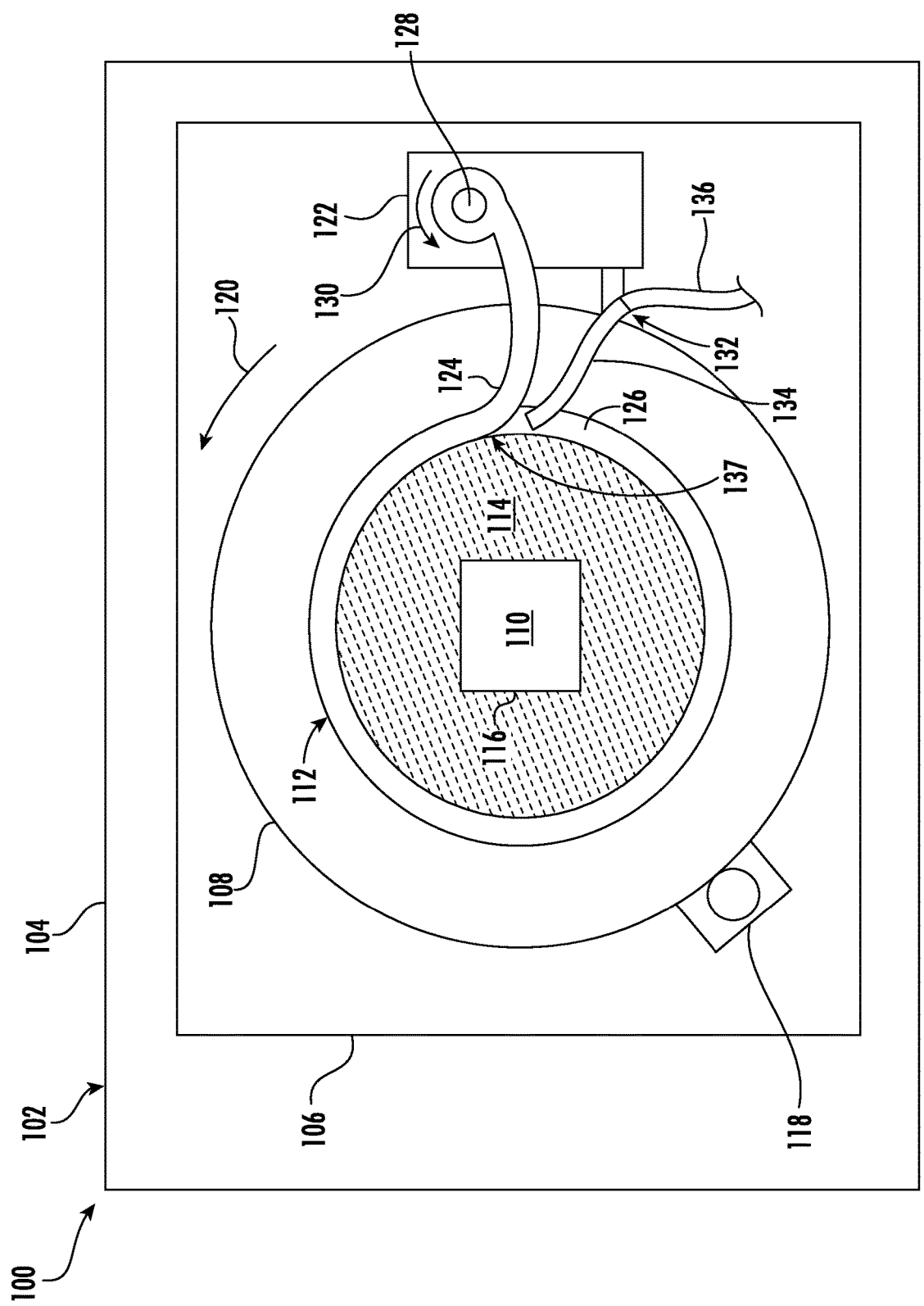
FIG. 1 is a diagrammatic view of one embodiment of a system for additively manufacturing components, particularly illustrating a build plate of the system being rotatable within a build chamber of the system.

Repeat use of reference characters in the present specification and drawings is intended to represent the same or analogous features or elements of the present invention.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

In general, the present subject matter is directed to a system and method for additively manufacturing components. Specifically, in several embodiments, the system includes a build plate positioned within a build chamber of an additive manufacturing machine. As such, a component (e.g., a gas turbine engine component) and a containment wall surrounding the component may be additively printed or formed on the build plate. In this respect, after formation of the component and the containment wall, the space between the component and the containment wall is filled with unused powder. Moreover, in such embodiments, the containment wall includes first and second portions joined together at a separation line. In some embodiments, a frangible portion is positioned along the separation line such that the frangible portion couples the first and second portions of the containment wall. For example, the frangible portion may be thinner than the first and second portions of the containment wall.

Furthermore, the disclosed system includes a tooling assembly and a vacuum. More specifically, the tooling assembly is configured to split the containment wall at the separation line and pull the first portion of the containment wall away from the second portion of the containment wall while the build plate is present within the build chamber. Pulling the first portion away from the second portion exposes a portion of the powder present between the containment wall and the component. For example, in one embodiment, the tooling assembly includes a key configured to engage a loop coupled to the first portion of the containment wall. In such an embodiment, when relative movement between the build plate and the tooling assembly is generated, the key splits the containment wall at the separation line and pulls the first portion of the containment wall away from the second portion of the containment wall. In another embodiment, the tooling assembly includes a cutter and a reel. In such an embodiment, when relative movement between the build plate and the tooling assembly is generated, the cutter splits the containment wall at the separation line and the reel pulls the first portion of the containment wall away from the second portion of the containment wall. The vacuum removes the exposed portion of the powder from the build chamber while the build plate is present within the build chamber. Such powder removal may be performed after the containment wall is split or simultaneously as the containment wall is split.

The disclosed system and method provide one or more technical advantages. As described above, unused powder must be discarded after it has been exposed to the ambient atmosphere a certain number of times (e.g., ten times). Moreover, such powder is expensive. In this respect, removing the powder from within the containment wall while the build plate remains within the build chamber of the additive manufacturing machine (i.e., in situ) prevents exposure of the powder to the oxygen and the moisture present within the ambient atmosphere. As such, this use of the powder does not count toward the total number of times the powder can be used. Thus, the disclosed system and method allow unused powder to be recycled many more times than conventional systems and methods, thereby lowering the production cost of the components being additively manufactured. Additionally, removing the unused powder while the build plate remains within the build chamber reduces the total weight of the build plate and the component, thereby making removal of the build plate and component from the build chamber easier.

Referring now to the drawings, FIG. 1 is a diagrammatic view of one embodiment of a system 100 for additively manufacturing components. As shown, the system 100 includes an additive manufacturing machine 102 having a build chamber 104 in which one or more components (e.g., a gas turbine engine component(s)) are printed or otherwise formed using one or more additive manufacturing techniques. As used herein, the terms "additively manufacturing" or "additive manufacturing techniques or processes" refer to manufacturing processes in which successive layers of material are deposited on top of each other to build-up, layer-by-layer, a three-dimensional component.

In several embodiments, the additive manufacturing machine 102 uses a powder bed fusion (PBF) technique, as direct metal laser melting (DMLM) or directed metal laser sintering (DMLS), to additively form the component(s). In such embodiments, the components are additively printed on a build plate by depositing a first layer of powder onto the build plate, melting or fusing a second layer of powder on top of the first layer, melting or fusing a third layer of powder on top of the second layer, and so on. Furthermore, in alternative embodiments, the additive manufacturing machine 100 may use any other suitable additive manufacturing technique(s) or process(es).

In this respect, the system 100 includes a build platform 106 and a build plate 108 positioned within the build chamber 104. More specifically, as shown, a component 110 is additively printed/formed on the build plate 108 (e.g., using a PBF technique). Furthermore, during printing/formation of the component 110, a containment wall 112 is formed around the exterior of the component 110. The containment wall 112, in turn, retains powder 114 within a small region surrounding the component 110 on the build plate 108, thereby reducing the amount of powder used during printing/formation of the component 110. As such, the powder 114 is present between an exterior surface 116 of the component 110 and the containment wall 112 after the component 110 is formed. As will be described below, the system 100 removes this powder 114 from the space between the component 110 and the containment wall 112 while the build plate 108 is present within the build chamber 104. Additionally, as shown, the build plate 108 is positioned on top of the build platform 106. Thus, the build platform 106 may be movable within the build chamber 104 along a vertical direction (e.g., along a Z-axis) to allow successive layers of component 110 (and the containment wall 112) to be formed.

The component 110 may correspond to any suitable type of component that can be formed using an additive manufacturing technique(s). For example, in some embodiments, the component 110 may correspond to a gas turbine engine component, such as a vane, blade, fuel nozzle, or the like.

Although FIG. 1 illustrates a single component 110 and a single containment wall 112, any number of components and/or containment walls may be additively printed/formed on the build plate 108. Moreover, when multiple components are formed on the build plate 108, an individual containment wall may be formed around each component. Alternatively, multiple components may be surrounded by a single containment wall. Additionally, when the component(s) being formed on the build plate 108 are annular, an inner containment wall(s) may be formed within the component(s) to trap powder within a small region(s) between the interior surface(s) of the component(s) and the wall(s). In this respect, the inner containment wall(s) reduce the amount of powder present within the interior space of the annular component.

Additionally, in several embodiments, the build plate 108 may be configured to rotate within the build chamber 104. More specifically, in such embodiments, the system 100 includes an actuator 118 (e.g., an electric motor) configured to rotate the build plate 108 relative to the build platform 106 (e.g., as indicated by arrow 120 in FIG. 1). As will be described in greater detail below, the rotation of the build plate 108 within the build chamber 104 facilitates the removal of this powder 114 from the space between the component 110 and the containment wall 112. Moreover, in such embodiments, the build plate 108 may be cylindrical. However, in alternative embodiments, the build plate 108 may have any other suitable shape.

Furthermore, the system 100 includes a tooling assembly 122 positioned within the build chamber 104. In general, the tooling assembly 122 includes one or more components configured to split the containment wall 112 at a separation line(s) and pull a first portion 124 of the containment wall 112 away from a second portion 126 of the containment wall 112 while the build plate 108 is present within the build chamber 104. Pulling the first portion 124 of the containment wall 112 away from the second portion 126 of the containment wall 112, in turn, exposes a portion of the powder 114 present within the space between the containment wall 112 and the component 110. As will be described below, this exposed powder 114 is then removed.

In several embodiments, the tooling assembly 122 includes a key 128. More specifically, in such embodiments, the key 128 is configured to engage a loop coupled to the top end of the first portion 124 of the containment 112. In this respect, when the build plate 108 is rotated by the actuator 118 to generate relative movement between the build plate 108 and the tooling assembly 122, the key 128 splits the containment wall 112 along a separation line and pulls the first portion 124 of the containment wall 112 away from the second portion 126 of the containment wall 122. Moreover, as the build plate 108 rotates relative to the tooling assembly 122, the tooling assembly 122 may move downward from the top end of the containment wall 112 toward the build plate 108. As such, the rotation of the build plate 108 and the downward movement of the tooling assembly 122 may allow the key 128 to split the containment wall 112 along a separation line extending both circumferentially around the component 110 and from the top end of the component 110 to the bottom end of the component 110, such as in a helical manner. Additionally, as the key 128 travels along the separation line(s), the pulled away first portion 124 of the containment wall 122 is rolled up on the key 128. However, as will be described below, in certain instances, the separation line(s) of the containment wall 112 may extend in a different manner. In such instances, the tooling assembly 122 may move relative to the build plate 108 in any manner that allows the key 128 to split the containment wall(s) 112 along the separation line(s).

The key 128 may correspond to any suitable structure capable splitting the containment wall 112 at a separation line and pulls a first portion 124 of the containment wall 112 away from a second portion 126 of the containment wall 122. For example, in one embodiment, the key 128 corresponds to a spindle or reel that engages the loop. Moreover, in such an embodiment, the spindle rotates (e.g., as indicated by arrow 130 in FIG. 1) to pull the first portion 124 of the containment wall 112 away from the second portion 128 of the containment wall 122. The pulled away first portion 124 of the containment wall 122 is then rolled up onto the key 128.

Additionally, the system 100 includes a vacuum 132 configured to remove the portion of the powder 114 exposed by pulling back the first portion of the containment wall 112. Specifically, in several embodiments, the vacuum 132 includes a vacuum wand 134 positioned within the build chamber 104 and a vacuum tube 136 coupled to the vacuum wand 134. In such embodiments, the vacuum wand 134 is positioned behind the tooling assembly 122 relative to the direction of the relative movement between the build plate 108 and the tooling assembly 122. As such, the vacuum wand 134 applies a suction force to the exposed powder 114, thereby removing the exposed powder 114 from the space between the containment wall 112 and the component 110. The powder 114 then travels through the vacuum tube 136 to a storage hopper (not shown) that is sealed from the ambient atmosphere (i.e., the atmosphere outside of the additive manufacturing machine 102). For example, in one embodiment, the vacuum wand 134 is configured to follow a point of separation 137 of the containment wall 112 such that the exposed powder 114 is removed before the exposed powder 114 falls onto the build plate 108 or becomes airborne within the build chamber 104. In the illustrated embodiment, the vacuum wand 134 is coupled to the tooling assembly 122 to allow the vacuum wand 134 to move with the tooling assembly 122. However, in alternative embodiments, the vacuum wand 134 may be independently movable relative to the tooling assembly 122.

Figure 2:
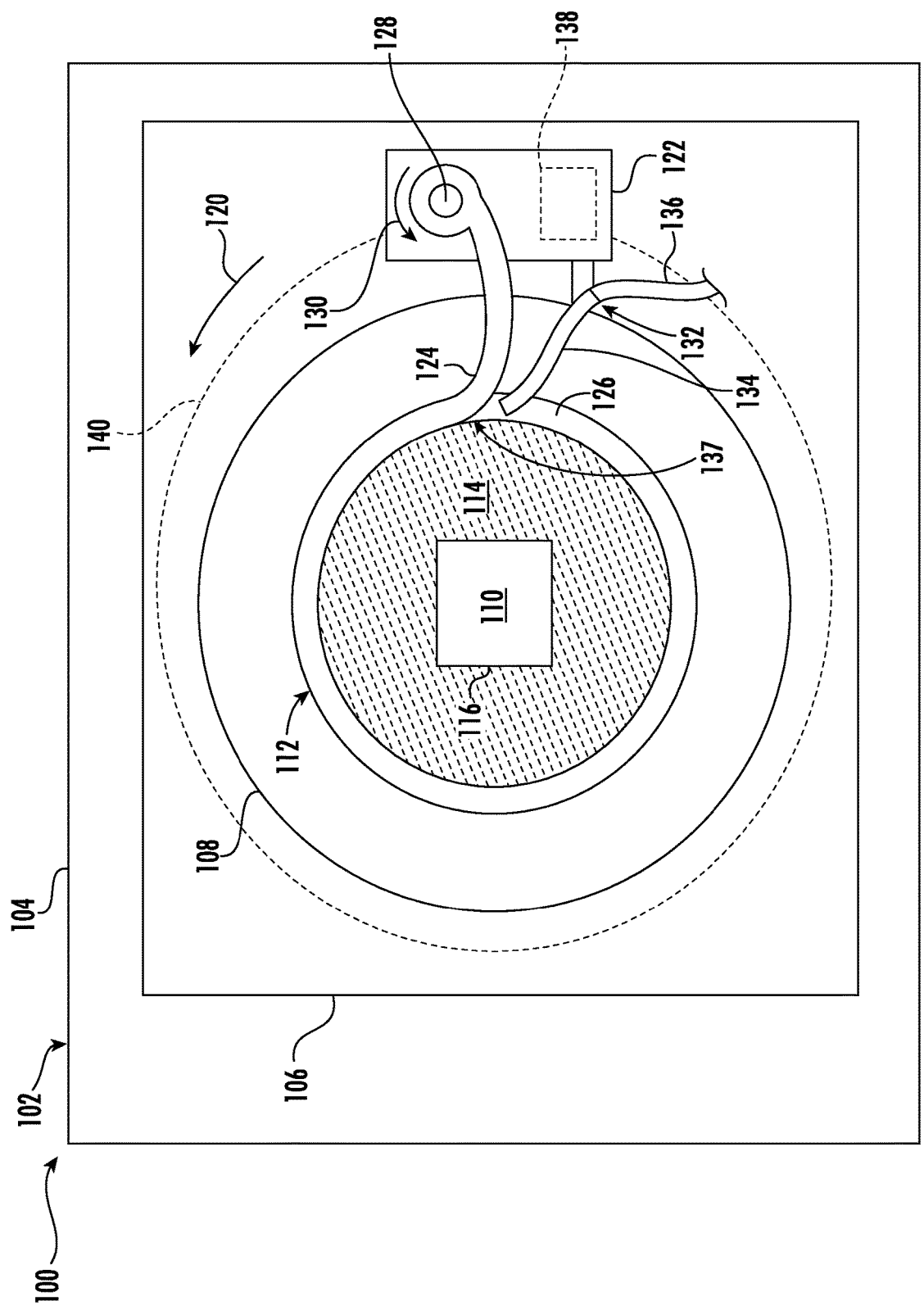
FIG. 2 is a diagrammatic view of another embodiment of a system for additively manufacturing components, particularly illustrating a tooling assembly of the system being configured to move circumferentially around a build plate of the system.

FIG. 2 is a diagrammatic view of another embodiment of the system 100 for additively manufacturing components. Like the embodiment shown in FIG. 1, the embodiment of the system 100 shown in FIG. 2 includes a build plate 108 and a tooling assembly 122 configured to split a containment wall 112 positioned on the build plate 108 at a separation line(s) and pull a first portion 124 of the containment wall 112 away from a second portion 126 of the containment wall 112. Furthermore, like the embodiment shown in FIG. 1, the embodiment of the system 100 shown in FIG. 2 also includes a vacuum 132 configured to remove the portion of the powder 114 exposed by pulling back the first portion 124 of the containment wall 112. However, unlike the embodiment shown in FIG. 1, the relative movement between the build plate 108 and the tooling assembly 122 is not generated by rotating the build plate 108 within the build chamber 104. Instead, in the embodiment of the system 100 shown in FIG. 2, the build plate 108 is fixed or stationary within the build chamber 104. In this respect, in such an embodiment, the system 100 includes an actuator 138 (e.g., an electric motor) configured to move the tooling assembly 122 circumferentially around the containment wall 112 (e.g., as indicated by dashed line 140 in FIG. 2) as the tooling assembly 122 splits the containment wall 112 and pulls the first portion 124 of the containment wall 112 away.

Figure 3:
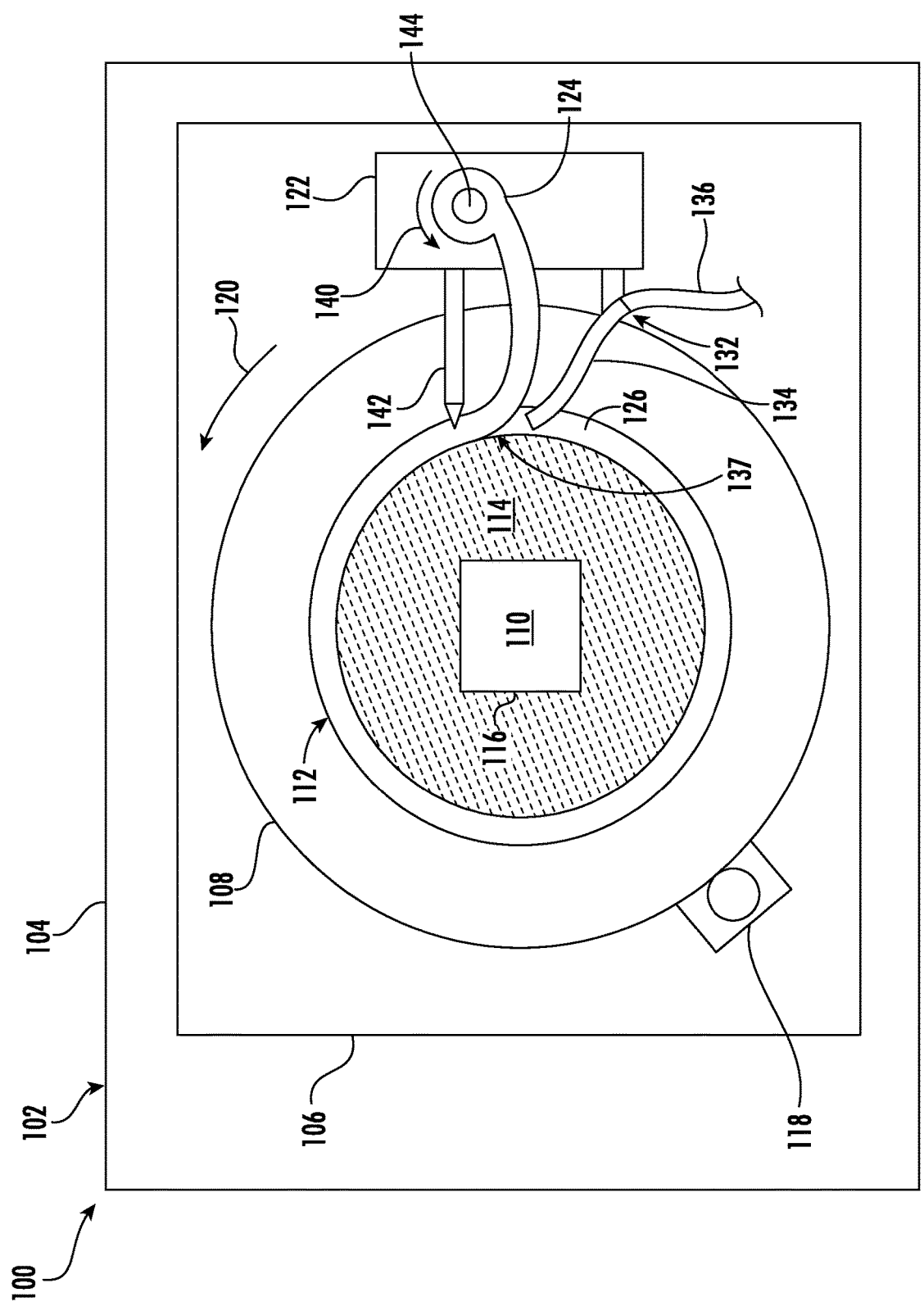
FIG. 3 is a diagrammatic view of a further embodiment of a system for additively manufacturing components, particularly illustrating the system including a cutter.

FIG. 3 is a diagrammatic view of another embodiment of the system 100 for additively manufacturing components. Like the embodiments shown in FIGS. 1 and 2, the embodiment of the system 100 shown in FIG. 3 includes a build plate 108 and a tooling assembly 122 configured to split a containment wall 112 positioned on the build plate 108 at a separation line(s) and pull a first portion 124 of the containment wall 112 away from a second portion 126 of the containment wall 112. Furthermore, like the embodiments shown in FIGS. 1 and 2, the embodiment of the system 100 shown in FIG. 3 also includes a vacuum 132 configured to remove the portion of the powder 114 exposed by pulling back the first portion 124 of the containment wall 112. However, unlike the embodiments shown in FIGS. 1 and 2, tooling assembly 122 of the embodiment of the system 100 shown in FIG. 3 includes a cutter 142 and a reel 144. More specifically, the cutter 142 is configured to split the containment wall 112 at a separation line(s) when relative movement between the build plate 108 and the tooling assembly 122 is generated. As such, the cutter 142 may correspond to any suitable cutting device, such as a stationary blade, a rotating blade, or a reciprocating blade. In addition, when the relative movement between the build plate 108 and the tooling assembly 122 is generated, the reel 144 is configured to pull the first portion 124 of the containment wall 112 away from the second portion 126 of the containment wall 112 and roll up the pulled away first portion 124 of the containment wall 112. For example, the reel 144 may be configured to rotate (e.g., as indicated by arrow 146 in FIG. 3) to pull away and roll up the first portion 124 of the containment wall 112.

The embodiment of the system 100 shown in FIG. 3 can generate the relative movement between the build plate 108 and the tooling assembly 122 in any suitable manner. For example, as illustrated, the embodiment of the system 100 shown in FIG. 3 includes the actuator 118, which is configured to rotate the build plate 108 relative to the build platform 106 (e.g., as indicated by arrow 120 in FIG. 3). Alternatively, the build plate 108 may be fixed or stationary within the build chamber 104. Thus, the system 100 may include the actuator 138, which is configured to move the tooling assembly 122 circumferentially around the containment wall 112.

Figure 4:
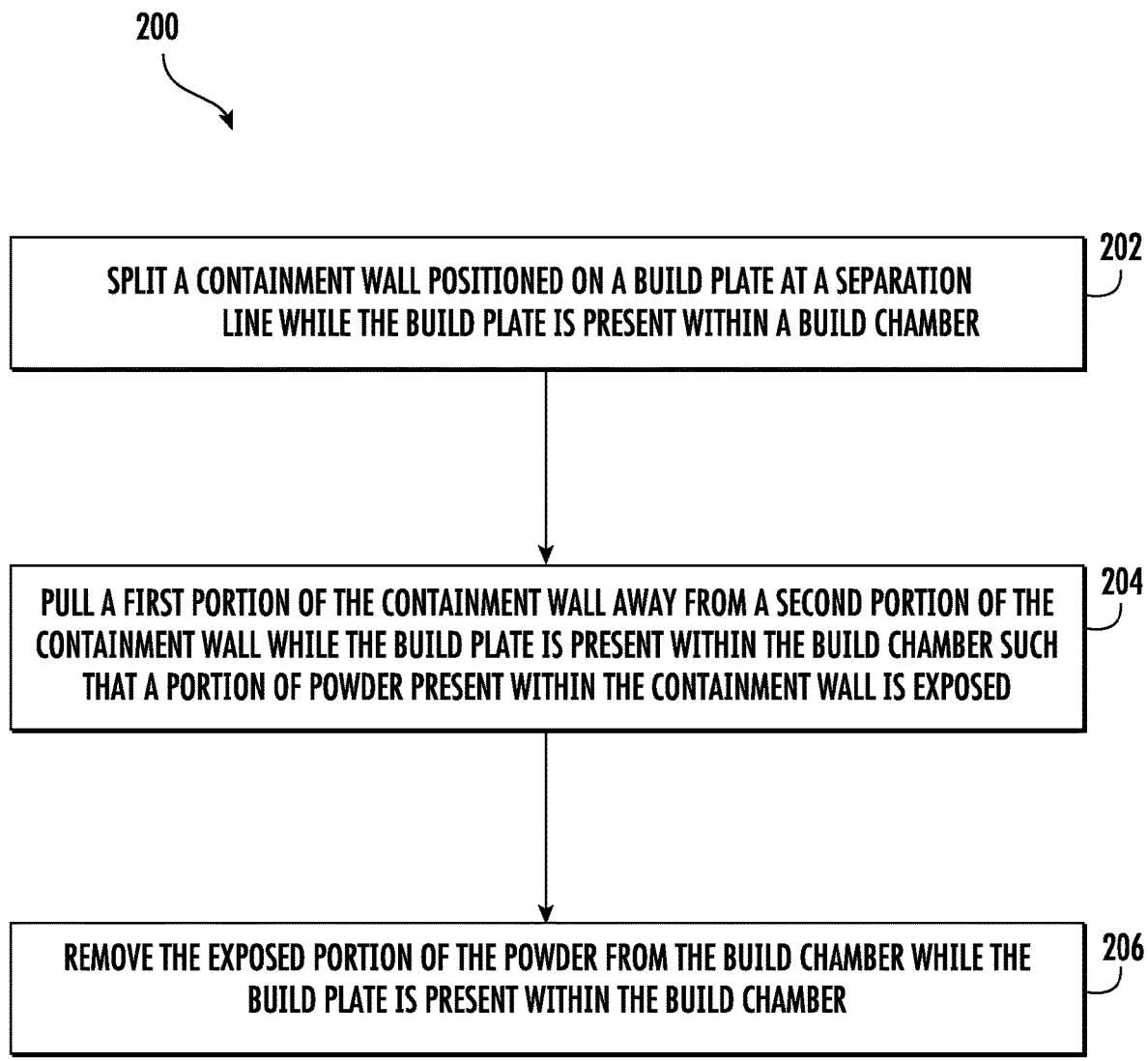
FIG. 4 is a flow diagram of one embodiment of a method for additively manufacturing components.

FIG. 4 is a flow diagram of one embodiment of a method 200 for additively manufacturing components. In general, the method 200 will be discussed in the context of the system 100 described above and shown in FIGS. 1-3. However, the disclosed method 200 may be implemented within any system having any suitable configuration. In addition, although FIG. 4 depicts steps performed in a particular order, the disclosed methods are not limited to any particular order or arrangement. As such, the various steps of the disclosed methods can be omitted, rearranged, combined, and/or adapted in various ways without deviating from the scope of the present disclosure.

As shown, as (202), the method 200 includes splitting a containment wall positioned on a build plate at a separation line while the build plate is present within a build chamber. More specifically, as described above, one or more components 110 and one or more containment walls 112 surrounding such component(s) 110 are additively printed or formed on the build plate 108 while the build plate 108 is present within the build chamber 104 of the additive manufacturing machine 102. In this respect, upon completion of such printing/formation, powder 114 is present between the containment wall(s) 112 and the component(s) 110. As such, in several embodiments, the tooling assembly 122 splits the containment wall(s) 112 at a separation line(s) while the build plate 108 is present within the build chamber 104.

Figures 5, 6:
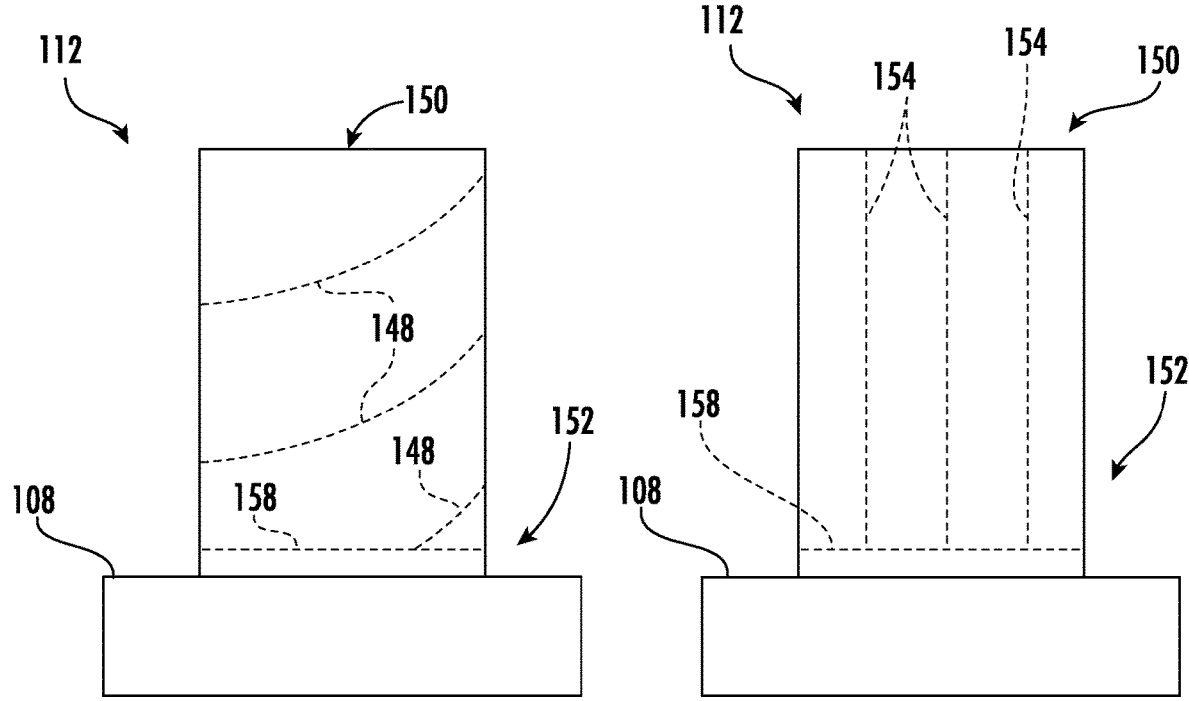
FIG. 5 is a side view of one embodiment of a containment wall, particularly illustrating the containment wall including a helical separation line.
FIG. 6 is a side view of another embodiment of a containment wall, particularly illustrating the containment wall including vertical separation lines.
Figure 7:
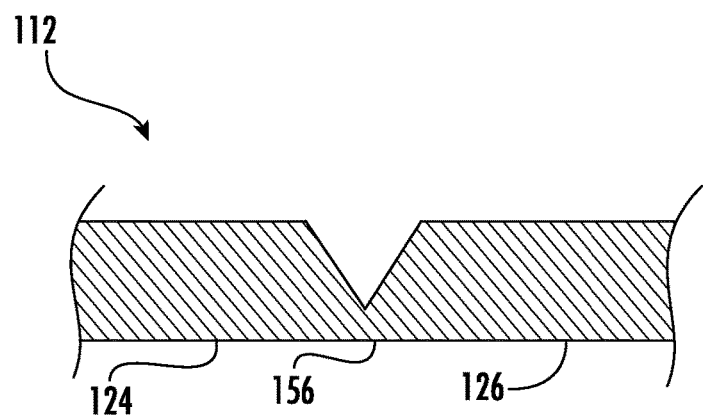
FIG. 7 is a cross-sectional view of one embodiment of a containment wall, particularly illustrating a frangible portion of the containment wall.

FIGS. 5-7 illustrate various embodiments of separation line(s) on a containment wall 112. In general, a separation line corresponds to a location, portion, or line along the containment wall 112 at which the containment wall 112 is split into the first and second portions 124, 126. As will be described below, after the containment wall 112 is split at (202), the first portion 124 will be pulled away from the second portion 126 to expose the powder 114 present between the containment wall(s) 112 and the component(s) 110. For example, as shown in FIG. 5, in some embodiments, the containment wall(s) 112 include a helical separation line 148. In such embodiments, the helical separation line 148 extends helically around the containment wall 112 from a top end 150 of the containment wall 112 toward a bottom end 152 of the containment wall 112. As shown in FIG. 6, in other embodiments, the containment wall(s) 112 include a plurality of vertical separation lines 154. In such embodiments, the vertical separation lines 150 are spaced apart from each circumferentially around the containment wall 112 and extend from the top end 150 of the containment wall 112 toward the bottom end 152 of the containment wall 112 However, in alternative embodiments, the containment wall(s) 112 may include any other suitable separation lines, such as horizontal separation lines.

In several embodiments, as shown in FIG. 7, the containment wall(s) 112 further includes a frangible portion(s) 156 positioned along the separation line(s) such that the frangible portion(s) 156 couples the first and second portions 124, 126 of the containment wall(s) 112. In general, the frangible portion(s) 156 is configured to split, tear, or otherwise be severed more easily than the first and second portions 124, 126 of the containment wall(s) 112. As such, the frangible portion(s) 156 facilitates splitting of the containment wall(s) 112 at (202). For example, in the illustrated embodiment, the frangible portion(s) 156 is thinner than the first and second portions 124, 126 of the containment wall(s) 112 such that it is easier to split the frangible portion(s) 156 than the first and second portions 124, 126. However, in other embodiments, the frangible portion(s) 156 may have any other suitable feature(s) that facilitate splitting, such as perforations. In embodiments in which the containment wall(s) 112 include the frangible portion(s) 156 positioned along the separation line(s), the containment wall(s) 112 may include a horizontal separation line 158 positioned adjacent to, but spaced apart from, the bottom end(s) 152 of the containment wall(s) 112 as shown in FIGS. 5 and 6. Placing a frangible portion 156 along this horizontal separation line 158 prevents weakening the connection between the build plate 108 and the containment wall 112, while still allowing most of the containment wall 112 to be pulled back. Alternatively, the separation line(s) may not be frangible or otherwise more easily split than the first and second portions 124, 126 of the containment wall(s) 112.

Figure 8:
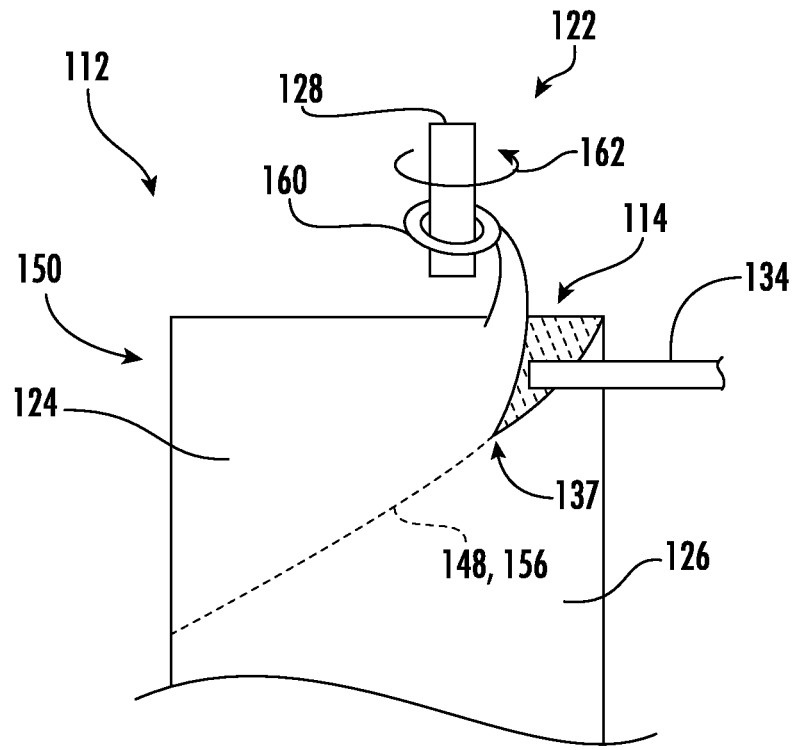
FIG. 8 is a side view of one embodiment of a tooling assembly splitting a containment wall at separation line.

As shown in FIG. 8, at (202), the method 200 may include using the key 128 to split the containment wall(s) 112. As described above, in several embodiments, the containment wall(s) 112 include a frangible portion(s) 156 positioned at its separation line(s) (e.g., the helical separation line 148). Moreover, in some embodiments, a loop(s) or hook 160 is attached to the first portion(s) 124 of the containment wall(s) 112 at the top end 150 thereof. In this respect, at (202), the key 128 engages the loop 160 such that, when relative movement between the build plate 108 and the tooling assembly 122 is generated, the key 128 splits the containment wall(s) 112 along the frangible portion(s) 156 at the separation line(s). The relative movement between the build plate 108 and the tooling assembly 122 along with movement of the tooling assembly 122 downward in the vertical direction allows the key 128 to split the containment wall(s) 112 along the entire length of the frangible portion(s) 156.

Figure 9:
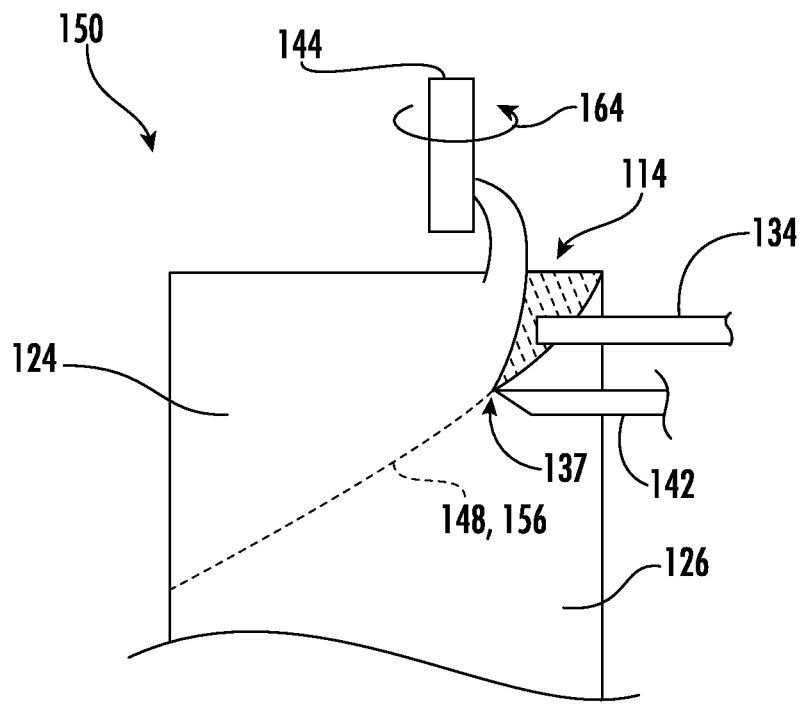
FIG. 9 is a side view of another embodiment of a tooling assembly splitting a containment wall at separation line.

Additionally, as shown in FIG. 9, at (202), the method 200 may include using the cutter 142 to split the containment wall(s) 112. Specifically, at (202), the cutter 142 cuts or otherwise splits the containment wall(s) 112 at the separation line(s) 148 when relative movement between the build plate 108 and the tooling assembly 122 is generated. The relative movement between the build plate 108 and the tooling assembly 122 along with movement of the tooling assembly 122 downward in the vertical direction allows the cutter 142 to split the containment wall(s) 112 along the entire length of the separation line(s) 148. The cutter 142 may be used to split the containment wall(s) when a frangible portion(s) 156 is present at the separation line(s) or when no frangible portion(s) 156 is present at the separation line(s).

Moreover, the relative movement between the build plate 108 and the tooling assembly 122 may be generated in any suitable manner. For example, in some embodiments, the actuator 118 may rotate the build plate 108 within the build chamber 104. In other embodiments, the actuator 138 may move the tooling assembly 122 circumferentially around the build plate 108.

As shown in FIG. 4, at (204), the method 200 includes pulling the first portion of the containment wall away from the second portion of the containment wall while the build plate is present within the build chamber such that a portion of the powder is exposed. For example, in several embodiments, while the build plate 108 is present within the build chamber 104, the tooling assembly 122 pulls the first portion(s) 124 of the containment wall(s) 110 away from the second portion(s) 126 of the containment wall(s) 110 to expose a portion of the powder 114 present within the space(s) between the containment wall(s) 112 and the component(s) 110.

In one embodiment, at (204), as shown in FIG. 8, when relative movement between the build plate 108 and the tooling assembly 122 is generated, the key 128 pulls the first portion(s) 124 of the containment wall(s) 112 away from the second portion(s) 126 of the containment wall(s) 112. Moreover, in such an embodiment, the pulled away first portion(s) 124 of the containment wall(s) 112 is rolled up on the key 128, such as by rotating the key 128 (e.g., as indicated by arrow 162 in FIG. 8). The relative movement between the build plate 108 and the tooling assembly 122 along with movement of the tooling assembly 122 downward in the vertical direction allows the key 128 to pull the first portion(s) 124 of the containment wall(s) 112 away from the second portion(s) 126 of the containment wall(s) 112 along the entire length of the frangible portion(s) 156.

In another embodiment, at (204), as shown in FIG. 9, when relative movement between the build plate 108 and the tooling assembly 122 is generated, the reel 144 pulls the first portion(s) 124 of the containment wall(s) 112 away from the second portion(s) 126 of the containment wall(s) 112. Moreover, in such an embodiment, the pulled away first portion(s) 124 of the containment wall(s) 112 is rolled up on the reel 144, such as by rotating the reel 144 (e.g., as indicated by arrow 164 in FIG. 9). The relative movement between the build plate 108 and the tooling assembly 122 along with movement of the tooling assembly 122 downward in the vertical direction allows the reel 144 to pull the first portion(s) 124 of the containment wall(s) 112 away from the second portion(s) 126 of the containment wall(s) 112 along the entire length of the separation line(s) (e.g., the frangible portion(s) 156).

Additionally, as shown in FIG. 4, at (208), the method 200 includes removing the exposed portion of the powder from the build chamber while the build plate is present within the build chamber. For example, in several embodiments, the vacuum 132 removes the exposed portion of the powder 114 from the build chamber 104 while the build plate 108 is present within the build chamber 104. Moreover, the relative movement between the build plate 108 and the tooling assembly 122 along with movement of the tooling assembly 122 downward in the vertical direction allows the vacuum 132 to remove substantially all of the powder present within the space(s) between the containment wall(s) 112 and the component(s) 110 by permitting the vacuum wand 134 to follow the tooling assembly 122 along the separation line(s). The removed powder 114 is then stored within a storage hopper (not shown) that is sealed from the ambient atmosphere (i.e., the atmosphere outside of the additive manufacturing machine 102). Thereafter, the powder 114 present within the hopper can be reused in a subsequent additive manufacturing process.

The system 100 and the method 200 provide one or more technical advantages. As described above, unused powder must be discarded after it has been exposed to the ambient atmosphere a certain number of times (e.g., ten times). Moreover, such powder is expensive. In this respect, removing the powder 114 from within the containment wall(s) 112 while the build plate 108 remains within the build chamber 104 of the additive manufacturing machine 102 (i.e., in situ) prevents exposure of the powder 114 to the oxygen and the moisture present within the ambient atmosphere. As such, this use of the powder 114 does not count toward the total number of times the powder 114 can be used. Thus, the system 100 and the method 200 allow unused powder to be recycled many more times than conventional systems and methods, thereby lowering the production cost of the components being additively manufactured. Furthermore, the system 100 allows the powder 114 to be sieved while in the inert atmosphere (e.g., that of the additive manufacturing machine 102) before or after storage, but before reuse. Additionally, removing the unused powder 114 while the build plate 108 remains within the build chamber 104 reduces the total weight of the build plate 108 and the component(s) 110 produced thereon, thereby making removal of the build plate 108 and component(s) 110 from the build chamber 104 easier.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A system for additively manufacturing components, the system comprising: a build chamber; a build plate on which a component and a containment wall surrounding the component are additively formed, the containment wall surrounding the component such that powder is present between the component and the containment wall, the containment wall including first and second portions joined together at a separation line, the build plate positioned within the build chamber; a tooling assembly configured to split the containment wall at the separation line and pull the first portion of the containment wall away from the second portion of the containment wall while the build plate is present within the build chamber such that a portion of the powder is exposed; and a vacuum configured to remove the exposed portion of the powder from the build chamber while the build plate is present within the build chamber.

The system of one or more of these clauses, further comprising: an actuator configured to generate relative movement between the build plate and the tooling assembly as the tooling assembly splits the containment wall and pulls the first portion of the containment wall away.

The system of one or more of these clauses, wherein the actuator is configured to rotate the build plate within the build chamber as the tooling assembly splits the containment wall and pulls the first portion of the containment wall away.

The system of one or more of these clauses, wherein the build plate remains stationary within the build chamber and the actuator is configured to move the tooling assembly circumferentially around the containment wall as the tooling assembly splits the containment wall and pulls the first portion of the containment wall away.

The system of one or more of these clauses, wherein the vacuum includes a vacuum wand positioned behind the tooling assembly relative to a direction of the relative movement between the build plate and the tooling assembly.

The system of one or more of these clauses, wherein the vacuum wand is configured to follow a point of separation of the containment wall such that the exposed powder is removed before the exposed powder falls or becomes airborne within the build chamber.

The system of one or more of these clauses, wherein: the containment wall further includes a frangible portion positioned along the separation line such that the frangible portion couples the first and second portions of the containment wall; and the tooling assembly is further configured to split the containment wall along the frangible feature.

The system of one or more of these clauses, wherein the containment wall further includes a loop coupled to the first portion of the containment wall at a top end of the containment wall.

The system of one or more of these clauses, wherein the tooling assembly comprises a key configured to engage the loop such that, when relative movement between the build plate and the tooling assembly is generated, the key splits the containment wall at the separation line and pulls the first portion of the containment wall away from the second portion of the containment wall.

The system of one or more of these clauses, wherein the pulled away first portion of the containment wall is rolled up on the key.

The system of one or more of these clauses, wherein the frangible portion of the containment is thinner than the first and second portions of the containment wall.

The system of one or more of these clauses, wherein the separation line extends helically around the containment wall.

The system of one or more of these clauses, wherein the separation line extends vertically along the containment wall.

The system of one or more of these clauses, wherein the tooling assembly includes a cutter configured to split the containment wall at the separation line when relative movement between the build plate and the tooling assembly is generated.

The system of one or more of these clauses, wherein the tooling assembly includes a reel configured to pull the first portion of the containment wall away from the second portion of the containment wall and roll up the pulled away first portion of the containment wall when the relative movement between the build plate and the tooling assembly is generated.

A method for additively manufacturing a component on a build plate positioned within a build chamber, the component surrounded by a containment wall positioned on the build plate such that powder is present between the component and the containment wall, the containment wall including first and second portions joined together at a separation line, the method comprising: splitting the containment wall at the separation line while the build plate is present within the build chamber; pulling the first portion of the containment wall away from the second portion of the containment wall while the build plate is present within the build chamber such that a portion of the powder is exposed; and removing the exposed portion of the powder from the build chamber while the build plate is present within the build chamber.

The method of one or more of these clauses, further comprising: generating relative movement between the build plate and the tooling assembly as the containment wall is split and the first portion of the containment wall is pulled away.

The method of one or more of these clauses, wherein generating relative movement comprises rotating the build plate within the build chamber as the containment wall is split and the first portion of the containment wall is pulled away.

The method of one or more of these clauses, wherein generating relative movement comprises holding the build plate holding stationary within the build chamber and moving a tooling assembly circumferentially around the containment wall as the containment wall is split and the first portion of the containment wall is pulled away.

The method of one or more of these clauses, wherein removing the exposed portion of the powder includes positioning a vacuum wand behind a tooling assembly relative to a direction of the relative movement between the build plate and the tooling assembly.

What is claimed is:

1. A system for additively manufacturing components, the system comprising:
    a build chamber;
    a build plate on which a component and a containment wall surrounding the component are additively formed, the containment wall surrounding the component such that powder is present between the component and the containment wall, the containment wall including first and second portions joined together at a separation line, the build plate positioned within the build chamber;
    a tooling assembly configured to split the containment wall at the separation line and pull the first portion of the containment wall away from the second portion of the containment wall while the build plate is present within the build chamber such that a portion of the powder is exposed; and
    a vacuum configured to remove the exposed portion of the powder from the build chamber while the build plate is present within the build chamber.

2. The system of claim 1, further comprising:
    an actuator configured to generate relative movement between the build plate and the tooling assembly as the tooling assembly splits the containment wall and pulls the first portion of the containment wall away.

3. The system of claim 2, wherein the actuator is configured to rotate the build plate within the build chamber as the tooling assembly splits the containment wall and pulls the first portion of the containment wall away.

4. The system of claim 2, wherein the build plate remains stationary within the build chamber and the actuator is configured to move the tooling assembly circumferentially around the containment wall as the tooling assembly splits the containment wall and pulls the first portion of the containment wall away.

5. The system of claim 2, wherein the vacuum includes a vacuum wand positioned behind the tooling assembly relative to a direction of the relative movement between the build plate and the tooling assembly.

6. The system of claim 5, wherein the vacuum wand is configured to follow a point of separation of the containment wall such that the exposed powder is removed before the exposed powder falls or becomes airborne within the build chamber.

7. The system of claim 1, wherein:
    the containment wall further includes a frangible portion positioned along the separation line such that the frangible portion couples the first and second portions of the containment wall; and
    the tooling assembly is further configured to split the containment wall along the frangible feature.

8. The system of claim 7, wherein the containment wall further includes a loop coupled to the first portion of the containment wall at a top end of the containment wall.

9. The system of claim 8, wherein the tooling assembly comprises a key configured to engage the loop such that, when relative movement between the build plate and the tooling assembly is generated, the key splits the containment wall at the separation line and pulls the first portion of the containment wall away from the second portion of the containment wall.

10. The system of claim 9, wherein the pulled away first portion of the containment wall is rolled up on the key.

11. The system of claim 7, wherein the frangible portion of the containment is thinner than the first and second portions of the containment wall.

12. The system of claim 7, wherein the separation line extends helically around the containment wall.

13. The system of claim 7, wherein the separation line extends vertically along the containment wall.

14. The system of claim 1, wherein the tooling assembly includes a cutter configured to split the containment wall at the separation line when relative movement between the build plate and the tooling assembly is generated.

15. The system of claim 14, wherein the tooling assembly includes a reel configured to pull the first portion of the containment wall away from the second portion of the containment wall and roll up the pulled away first portion of the containment wall when the relative movement between the build plate and the tooling assembly is generated.

* * * * *